US006680913B1

(12) United States Patent
Malmivirta et al.

(10) Patent No.: US 6,680,913 B1
(45) Date of Patent: Jan. 20, 2004

(54) METHOD AND SYSTEM FOR TESTING DATA CHANNEL FUNCTIONALITY IN A RADIO APPARATUS

(75) Inventors: Kari Malmivirta, Tampere (FI); Olli Varjus, Tampere (FI); Tapio Saarinen, Kello (FI); Petri Kotilainen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/325,617

(22) Filed: Jun. 3, 1999

(30) Foreign Application Priority Data

Jun. 3, 1998 (FI) .................................................. 981267

(51) Int. Cl.[7] .............................................. H04B 7/155
(52) U.S. Cl. ...................................... 370/249; 455/67.4
(58) Field of Search .............................. 370/241, 249, 370/257; 455/9, 67.4, 11.1

(56) References Cited

U.S. PATENT DOCUMENTS

| | | | |
|---|---|---|---|
| 5,381,444 A | | 1/1995 | Tajima .......................... 375/1 |
| 5,477,531 A | * | 12/1995 | McKee et al. |
| 5,490,235 A | | 2/1996 | Von Holten et al. ....... 395/2.79 |
| 5,553,059 A | * | 9/1996 | Emerson |
| 5,603,103 A | | 2/1997 | Halttunen et al. ............. 455/90 |
| 5,943,617 A | * | 8/1999 | Nakamura ................... 455/423 |
| 6,141,533 A | * | 10/2000 | Wilson et al. ............. 455/11.1 |
| 6,185,191 B1 | * | 2/2001 | Dipperstein ................. 370/249 |
| 6,253,060 B1 | * | 6/2001 | Komara et al. ................ 455/9 |

FOREIGN PATENT DOCUMENTS

DE 195 17 393 C1 10/1996

OTHER PUBLICATIONS

"The Speech Transcoding Frame 2000 for GSM Cellular Systems", Riggs et al, Bell Labs Technical Journal, 1996, pp. 7–20.
"CDMA Mobile Communication System Performance Analysis Tools for Network Parameter Planning", Kang et al., Vehicular Technology Conference, Mobile Technology for the Human Race, IEEE 46th, 1996.
"Loopback Radio Frequency Translator for the ACTS Mobile Terminal", J. F. Davis, WESCON/'93, Conference Record.

* cited by examiner

*Primary Examiner*—Kenneth Vanderpuye
(74) *Attorney, Agent, or Firm*—Perman & Green, LLP

(57) ABSTRACT

A mobile station comprises means (301, 302, 303, 304, 326) for receiving downlink data from test equipment and means (331, 310, 311, 312, 313) for sending uplink data to the test equipment. To test data channel operation a test loop (204, 332, 333) is established to loop downlink data received from the test equipment back to the uplink direction to the test equipment. During the test, the reception of downlink data and transmission of uplink data in the mobile station are controlled by a relatively low protocol level.

20 Claims, 3 Drawing Sheets

METHOD AND SYSTEM FOR TESTING DATA CHANNEL FUNCTIONALITY IN A RADIO APPARATUS

TECHNOLOGICAL FIELD

The invention relates in general to testing the functioning of radio apparatuses. In particular the invention relates to testing the functioning of data channels in a radio apparatus. The description of the invention especially focuses on the type approval testing of the functioning of a radio apparatus but the functioning of radio apparatuses is of course tested in many other connections as well, e.g. during product development, manufacture, repair and service.

BACKGROUND OF THE INVENTION

Up till the second-generation digital cellular radio systems, mobile stations have been mainly telephones and the information transmitted has been first analogue speech and then digitized speech. A certain so-called traffic channel has been specified for speech transmission on a radio connection between mobile station and base station, and the characteristics of said traffic channel have been optimized according to features typical of digitized speech. However, the use of mobile stations is becoming more diversified as extensions are being planned to the second-generation systems and especially when the third-generation cellular radio systems will be introduced. Good examples of second-generation extensions are the systems that are planned as GSM (Global System for Mobile telecommunications) extensions, namely, HSCSD (High Speed Circuit Switched Data), in which multiple timeslots in a TDMA frame are allocated to a connection between a terminal and base station, GPRS (General Packet Radio System), which is based on packet switched connections between a base station and terminal instead of the circuit switched connections used earlier, and EDGE (Enhanced Data rates for GSM Evolution), which achieves a considerably higher momentary transmission rate between a base station and terminal than prior-art systems by changing the modulation methods and channel coding. GSM generally refers to all its different versions at the 900-MHz, 1800-MHz, and 1900-MHz operating frequencies, although the latter two have also been called DCS1800 and DCS1900 (Digital Communications System at 1800/1900 MHz).

In the more diversified mobile communications, data transmission will have much more importance than nowadays. Data generally refers to transmitted information other than digitized speech. Data transmission is characterized by generally not being real-time and having totally different requirements concerning error correction and transmission rate fluctuations than digitized speech. Data transmission is used especially when a terminal of a cellular radio system comprises a mobile station to which a separate data-processing auxiliary such as a computer is connected. For data transmission, mobile communication systems specify special data channels the characteristics of which can be optimized for data transmission.

Testing data channel related functions of terminal equipment has proven problematic. Data channels have traditionally been used in situations according to FIG. 1 where a separate data terminal equipment (DTE) is locally connected to a mobile station (MS) functioning as terminal equipment through a terminal adapter (TA). During the test, a simulation system (SS) simulates a cellular radio system. Testing the functioning of a data channel has required that between the SS and DTE a working data link is established via the MS, serving a simultaneously running application requiring data transmission. The application in question has to be active in the DTE and it has to be simulated in the SS, which results in extra complexity in the test. Furthermore, GSM specification 05.05 specifies quite a high coding gain for data channels with respect to channel coding, which means that the number of bits to be tested easily grows quite large. This, in turn, adds to the duration of the test.

The need for a separate data terminal equipment and an application running in it as well as the long testing time easily result in that the data terminal equipment drops the data connection established for the test because a time-out occurs in the application in question or because the number of errors observed on the data channel exceeds a threshold specified in the application. In addition, the general test practice of looping a frame received by the data terminal equipment in the downlink direction from the SS bit by bit back to the SS in the uplink direction usually confuses the uplink frame numbering typical of data channels, which also causes the data terminal equipment to disconnect the data call. Furthermore, problems arise from the fact that information transmitted on data channels may comprise higher-level units which have to be broken down to several consecutive or closely-situated bursts for the radio connection between base station and mobile station. To be able to ensure error-free reception of information thus transmitted a data terminal equipment must decode a large number of frames and recombine the data in them. All this leads to that the testing of the functioning of a data channel according to the traditional method tests largely the operation of the terminal adapter and data terminal equipment connected to the mobile station rather than the operation of the mobile station itself. This is inappropriate, particularly as concerns tests related to type approval of mobile stations.

Solutions for the disconnection problem have been searched for in the direction of DTE operation, i.e. a special test mode has been specified in which normal responses to a long connection time and confusion of frame numbering are left out. This, however, will not eliminate the problem that the result of the test intended to test the mobile station largely depends on whether the data terminal equipment and the software controlling its operation function correctly.

SUMMARY OF THE INVENTION

An object of the present invention is to provide a method for testing the functioning of data channels in a mobile station such that the testing is directed as intended to the operation of the mobile station. Another object of the invention is to provide a mobile station in which the operation of data channels can be tested in the above-mentioned manner.

The objects of the invention are achieved by specifying the necessary functions to loop the downlink data related to the data channels tested back in the uplink direction in a mobile station such that the data do not travel through external data terminal equipment.

The method according to tie invention is characterized in that in response to a command of a certain protocol level received from the test equipment the mobile station establishes a data channel test loop to loop the downlink data received from the test equipment back in the uplink direction to the test equipment, and during the test, the reception of downlink data and transmission of uplink data are carried out controlled by said protocol level.

The invention is also directed to a mobile station which is characterized in that it comprises means for cycling downlink data received from test equipment back in the uplink direction to the test equipment in response to a command of a certain protocol level, controlled by said protocol level.

In accordance with the invention, the communications protocol controlling the test situation is altered such that in the test mode, only the necessary lower protocol level connection is opened between the mobile station and the test equipment simulating the cellular radio system. There is no need to connect an external data terminal equipment to the mobile station, nor is it necessary to establish a data connection proper in the sense that the higher protocol levels were aware of the connection established. As the higher protocol levels are not aware of any data connection, no function related to them will drop the connection prematurely. Test data are transferred downlink from the test equipment to the mobile station which loops the appropriate test data back in the uplink direction.

To test various functions of a mobile station a plurality of embodiments of the invention can be disclosed which differ in how "deep" in the mobile station the looping back of test data in the uplink direction occurs. Depth refers to the number of components and/or functions the downlink test data passes in the mobile station before being looped back uplink. Preferred embodiments include e.g. the loopback of test data, after reception, demodulation, and decryption to encryption, modulation and transmission, and after reception, demodulation, decryption and channel decoding to channel encoding, encryption, modulation and transmission.

The invention makes it possible to direct the testing of data channel functionality to those mobile station parts the operation of which is to be verified e.g. in connection with mobile station type approval tests. Furthermore, test equipment can be made simpler and tests avoid the difficulties caused by the operation of data terminal equipment. It is a further advantage of the invention that the connection between the test equipment and the mobile station tested will not be disconnected in the middle of a test. An additional advantage of the invention is that testing methods used by different manufacturers will become more uniform, which improves the reliability of testing.

BRIEF DESCRIPTION OF DRAWINGS

The invention will now be described in more detail with reference to the preferred embodiments presented by way of example and to the accompanying drawing wherein.

Above in conjunction with the description of the prior art reference was made to FIG. 1, so below in the description of the invention and its preferred embodiments reference will be made mainly to FIGS. 2 to 5. Like elements in the drawing are denoted by like reference designators.

DETAILED DESCRIPTION OF THE INVENTION

Figure 1:
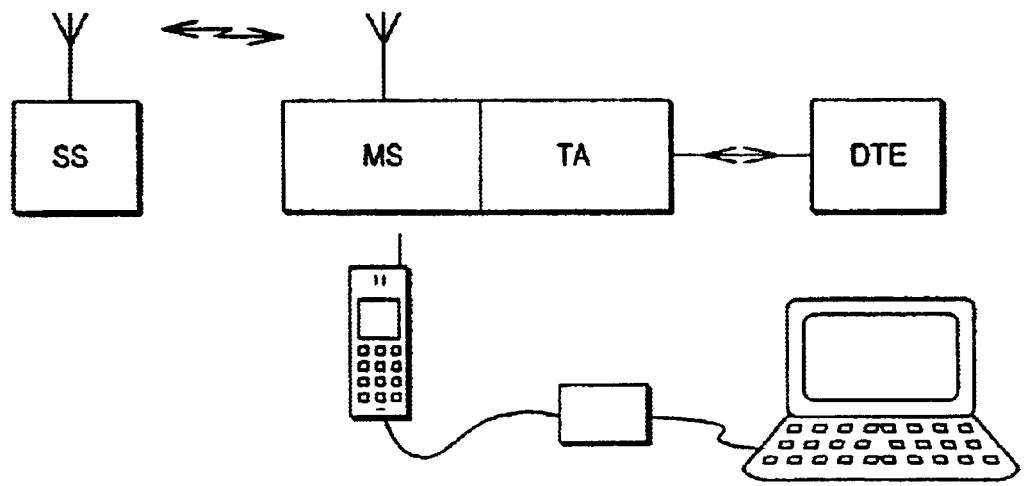
FIG. 1 illustrates testing according to the prior art.
Figure 2:
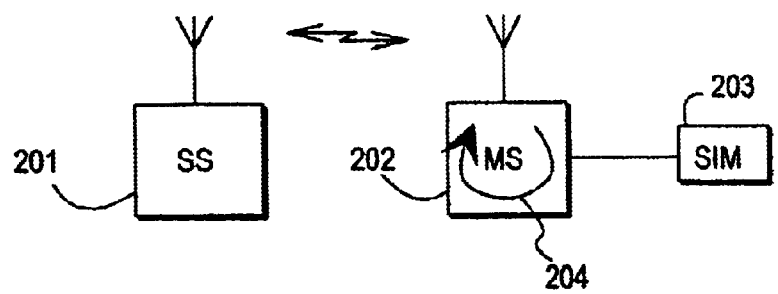
FIG. 2 illustrates the principle of the invention.

FIG. 2 shows an arrangement in which a mobile station 202 to be tested is connected in a known manner to test equipment 201. For purposes described later on it is advantageous that the mobile station 202 is equipped with a subscriber identity module (SIM) 203 designed especially for testing purposes, which SIM may be a smart card like the SIM cards used generally in mobile stations or a special SIM simulator to establish the necessary connections between the SIM interface in the mobile station and a special equipment simulating the operation of the SIM. It should be noted that the combination of a SIM simulator and the equipment simulating the operation of the SIM is not comparable with connecting an external data terminal equipment to the mobile station tested. The former is part of the test equipment as defined in the specification of the cellular radio system and its operation does not involve the problems disclosed in the description of the prior art with respect to connecting an external data terminal equipment to a mobile station in order to test the functionality of data channels.

In accordance with the invention the mobile station 202 defines a test loop 204, which means that data received on a certain downlink data channel are looped back to the uplink direction. The test loop is a logical connection from a certain point in the component and function chain intended for processing downlink data to a point in the component and function chain intended for processing uplink data. Later on it will be disclosed in more detail the data that are looped back uplink using the test loop.

Figure 3:
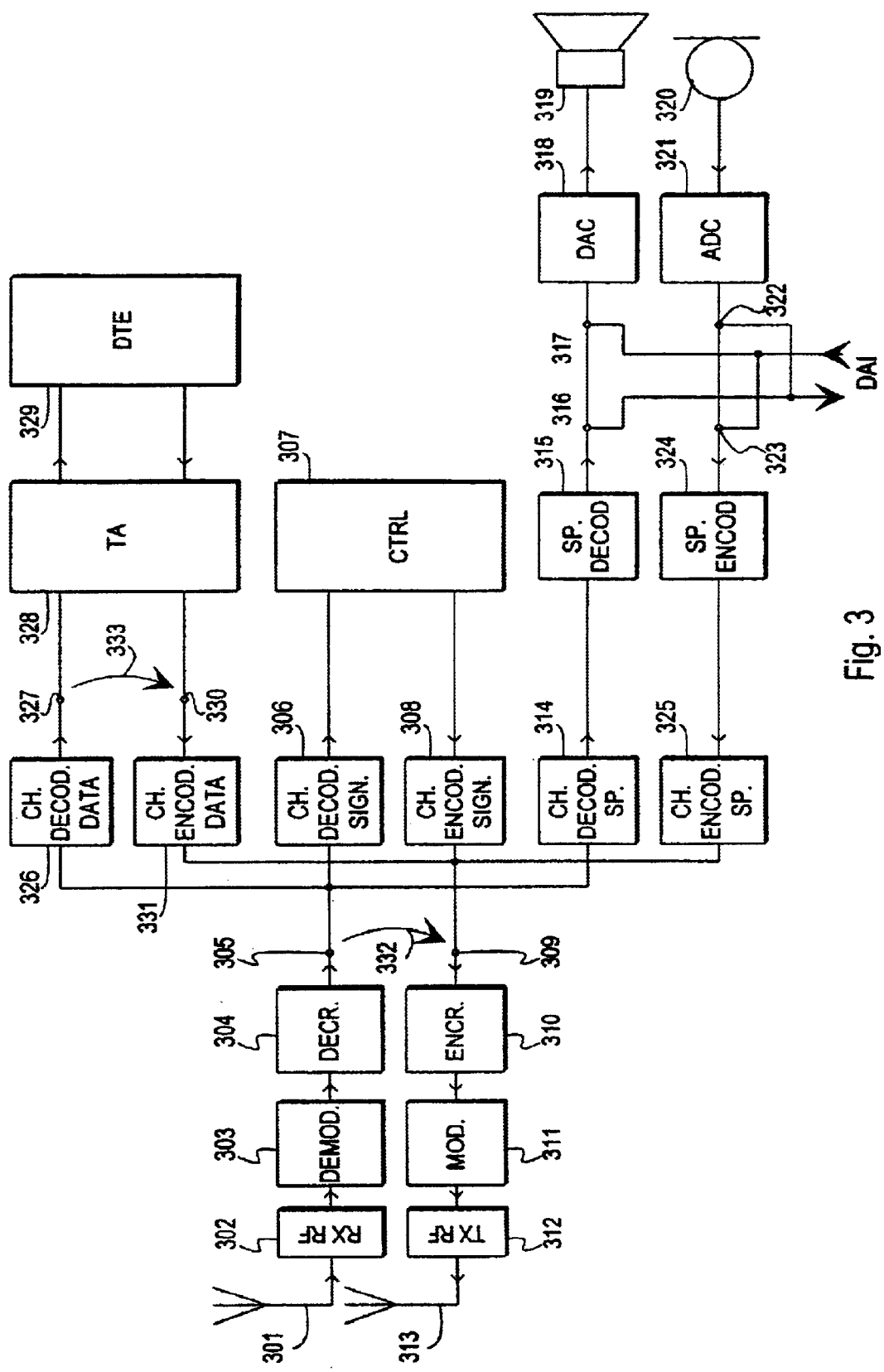
FIG. 3 shows a block diagram of a mobile station according to the invention.

FIG. 3 shows a block diagram of a mobile station to which the invention can be applied. The mobile station in FIG. 3 is a mobile phone, but the applicability of the invention is not in any way limited to mobile phones. Interface 301 is an antenna interface through which the downlink radio frames (produced by the test equipment in the case of testing) are directed to the mobile station. Block 302 represents in general all the known RF and IF parts by means of which the received radio-frequency signal is converted to baseband. The information in the baseband signal is reconstructed in a demodulator 303 and possible encryption is decrypted in a decryption block 304. From this point 305 on, the processing of received information branches according to whether it comprises signalling, digitized speech or data. Signalling channel information is directed to a channel decoder 306 and therefrom to a control block 307, which is a microprocessor and controls the operation of the mobile phone. Uplink signalling channel information is produced in the control block 307 and channel-encoded in block 308. From point 309 on, the channel-encoded uplink signalling information is handled just like any other uplink information, i.e. it is encrypted in an encryption block 310, modulated to baseband oscillation in a modulator 311, and mixed to radio frequency in block 312 representing in general the RF parts in the transmit branch, after which it can be transmitted via an antenna interface 313. Antenna interfaces 301 and 313 may be one and the same if mixing of uplink and downlink information is prevented by means of an appropriate duplexing block (not shown).

Downlink digitized speech is directed from point 305 to a channel decoder 314 for speech channels, and the signals produced by said decoder are further speech decoded in block 315. Points 316 and 317 form part of a so-called digital audio interface (DAI) by means of which digital speech information can be monitored in the test equipment, Disregarding the DAI, there is a direct connection from the speech decoder 315 to a D/A converter 318 which converts speech information to analog form reproducible by a loudspeaker 319. In the uplink direction a microphone 320 picks up speech which is digitized in an A/D converter 321 and which can then be directed via the DAI to the test equipment; this portion of the DAI is represented by points 322 and 323. Digitized speech may also be directed from block 321 direct to a speech encoder 324 and from there to a channel encoder 325 for speech channels and further to point 309 from which point on the processing of the information continues as described above for uplink signalling information.

Downlink data channel information is directed from point 305 to a channel decoder 326 for data channels. When the mobile phone is used together with an external data terminal equipment or when the mobile phone is tested using the method according to the prior art the channel-decoded data channel information is directed via point 327 to a terminal adapter 328 and further to an external terminal equipment 329. Similarly, uplink data channel information is directed from the data terminal equipment 329 via the terminal adapter 328 and point 330 to a channel encoder 331 for data channels which channel-encodes the data which then proceed from point 309 toward the antenna interface 313 as described above for uplink signalling information.

The blocks shown in FIG. 3 are not necessarily separate in a real mobile phone but e.g. the channel coding and decoding blocks 306, 308, 314, 325, 326 and 331 can be realized in a single circuit which is programmed to operate in different ways depending on whether it is processing signalling, speech or data. It is, however, customary to depict the blocks shown in FIG. 3 as separate blocks because it helps to illustrate the operation of the mobile phone.

Loopback according to the invention of data channel related data from the downlink direction to the uplink direction can be performed at many points of FIG. 3 depending on which are the parts the functioning of which is to be tested. This patent application describes two exemplary embodiments of the invention. In the first embodiment, the test loop refers to the loopback of data channel related data from point 305 to point 309, as depicted by line 332. In the second embodiment, the test loop refers to the loopback of data channel related data from point 327 to point 330, as depicted by line 333.

Test loops are established by certain commands which the mobile station tested receives from the test equipment. To illustrate the background and processing of those commands it will be next described briefly a portion of the protocol stack of an exemplary cellular radio system defined in the specification of said cellular radio system with reference to FIG. 4. It is a signalling architecture for the so-called Layer 3 protocol in the GSM system, as specified in ETS GSM 04.07, although some minor simplifications have been made in the drawing for graphic clarity which have no significance as regards the invention.

Figure 4:
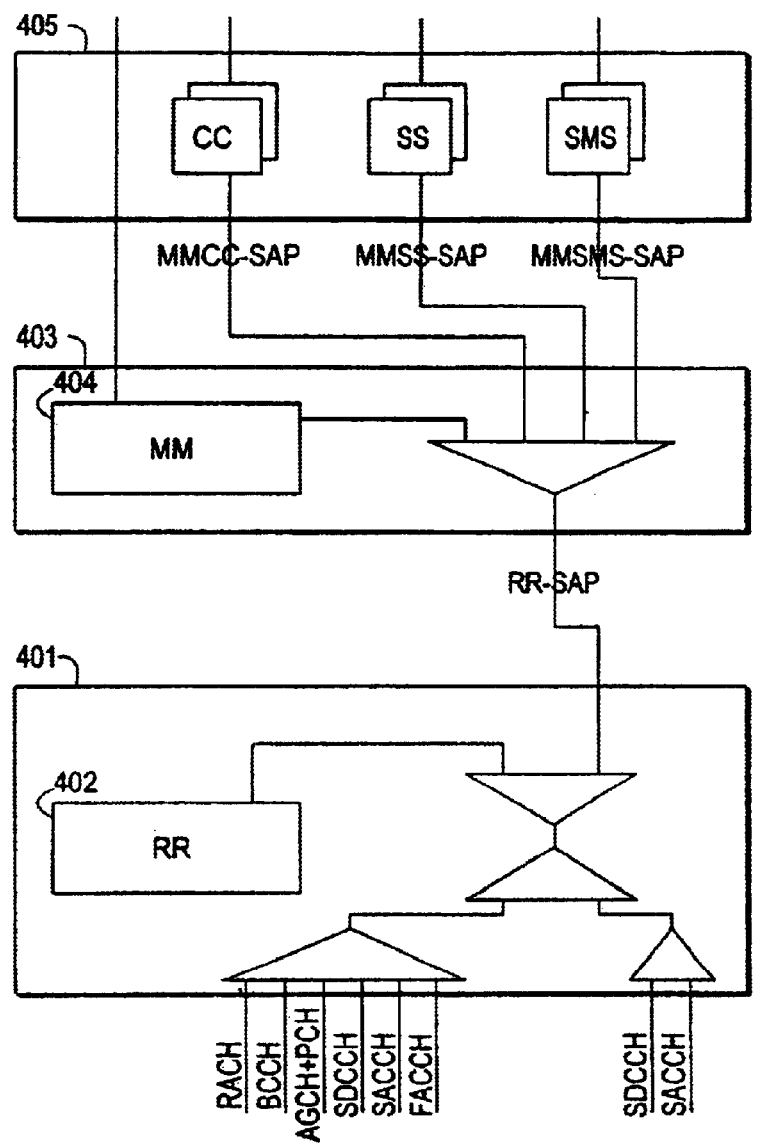
FIG. 4 shows the architecture of a protocol level in a data communications protocol.

The lowest protocol layer 401 in FIG. 4 is the RR (Radio Resource Management) layer which has connections downward via several separate logical channels. These channels are the RACH (Random Access Channel), BCCH (Broadcast Control Channel), AGCH+PCH (Access Grant Channel/Paging Channel), SDCCH (Stand-alone Dedicated Control Channel), FACCH (Fast Associated Control Channel) and SACCH (Slow Associated Control Channel). Channels related to radio resource management are in connection with RR block 402 and other channels are connected via an RR-SAP (RR Service Access Point) to the next higher protocol layer which is the MM (Mobility Management) layer 403. In that layer, channels related to terminal mobility management are connected to MM block 404 and other channels are directed via their SAPs further upward to layer 405: the connection related to call control travels through the MMCC-SAP to the CC (Call Control) part in layer 405, the connection related to supplementary services travels through the MMSS-SAP to the SS (Supplementary Services) part in layer 405, and the connection related to short messages travels through the MMSMS-SAP to the SMS (Short Message Services) part in layer 405. The CC, SS, and SMS parts of layer 405 and the MM block 404 of layer 403 have connections to the next higher protocol level which is not shown in the drawing.

Figure 5:
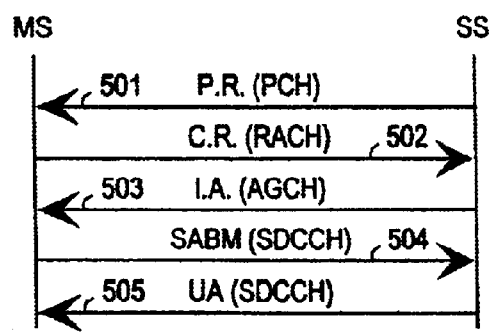
FIG. 5 illustrates the method according to the invention.

When mobile station testing in accordance with the invention is started, it is first established an arrangement according to FIG. 2 where the mobile station tested is connected in a known manner to the test equipment and test SIM. A mobile terminating (MT) radio link is established between the mobile station tested and the test equipment as shown in FIG. 5. The test equipment sends to the mobile station, which is on, a paging request 501 on the paging channel (PCH), and the mobile station responses with a channel request 502 sent on the RACH channel. After that, the test equipment sends an immediate assignment message 503, which may contain different instructions for the mobile station. The mobile station sends to the test equipment a SABM (Set Asynchronous Balanced Mode) message 504, which is in fact a paging response and which is sent on the SDCCH channel. The test equipment uses an unnumbered acknowledge (UA) 505 to acknowledge the SABM message it has received.

The contents and form of the messages shown in FIG. 5 are largely specified in specification GSM 04.08. However, some messages have portions reserved for future extensions, which portions can be utilized for harnessing the messages to serve the present invention. Specifically, the immediate assignment 503 contains so-called rest octets in which the first two bits indicate the contents of the rest of the octet. On the date of making this patent application, values 11 and 10 of the values of the first two bits of the rest octet have been reserved, but values 01 and 00 are unused. In accordance with a preferred embodiment of the invention at least one of those values can be reserved to indicate that in response to an immediate assignment 503 the mobile station tested has to set itself in a special test mode. The test mode is advantageously defined such that even if the RR-level connection between the mobile station and test equipment had been established, the RR layer (layer 401 in FIG. 4) of the protocol stack of the mobile station will not send indication about the connection upward to the MM layer (layer 403 in FIG. 4). As the MM layer and the protocol layers above it have no knowledge of the radio connection established, they will not attempt to drop the connection because of some monitoring mechanism characteristic of them, which e.g. would try to monitor errors in the connection.

So, test mode means that the mobile station to be tested is instructed to switch to a data channel and is kept there by means of Layer 3 signalling. The definition of the test mode as described above and realization of the definition in practice are easy to implement by a person skilled in the art since the mobile station operates entirely under the control of its control block (reference designator 307 in FIG. 3). The control block in turn is a microprocessor which executes a program stored in the memory means at its disposal. When that program is written such that in response to the reception of a certain Layer 3 command no notification is sent to the higher protocol layers, the mobile station is made to operate in the desired manner according to the invention.

When a connection has been established in the manner according to FIG. 5 the test equipment can send to the mobile station being tested any commands that do not require the participation of higher protocol levels, which are unaware of the connection. Below, it is first discussed a case where the test equipment wants the mobile station to loop back the downlink data transmitted on the data channel after demodulation and decryption, i.e. from point 305 to point 309 as depicted by arrow 332, referring to markings in FIG. 3. For simplicity, this test loop can be called the G loop. As an example, let us particularly consider a case where the data channel to be tested is a HSCSD channel, i.e. one in which the data can be located in more than one timeslot in the radio frame. Such a channel may also be called a multi-slot channel.

First, the test equipment sends a test loop closing command related to the data channel, which command can be called CLOSE_Multi-slot_loop_CMD. The closing command may include an identifier on the basis of which the mobile station knows that the loop is a G loop. Alternatively, it can be specified that if the CLOSE_Multi-slot_loop_CMD message does not include any particular identifier, it orders the closing of the G loop. For the test equipment to be able to verify that the message sent by it arrives at the destination, it advantageously starts a timer in conjunction with the sending of the message so that the mobile station has to acknowledge the message in a certain time set in the timer. The mobile station acknowledges the received message using an acknowledge message which can be called CLOSE_Multi-slot_loop_ACK. Having received the acknowledge message the test equipment stops said timer. The mobile station closes the test loop in a certain period of time from the sending of the acknowledge. Compatibility with certain functions specified earlier may require that a certain value be specified for said period of time. In the GSM system an advantageous value for said period of time is one so-called reporting period, i.e. the duration of a block on the SACCH channel, which corresponds to the length of 104 radio frames. Furthermore, it is advantageous to specify that if the test loop is already closed or an active radio connection has not been established in the manner according to FIG. 5, the mobile station shall ignore the CLOSE_Multi-slot_loop_CMD message.

As soon as the G loop has been closed the test equipment can start sending test data. Testing is preferably carried out such that the test equipment generates test bursts in which the information bits contain desired "raw data", i.e. bit combinations the reception of which is to be examined. Functionally, data transmission and reception occur on the physical protocol level called Layer 1. In principle, the testing need not involve any higher protocol levels in the mobile station. Layer 1 does not, however, include any commands related to the control of the operation of the mobile station but in order to receive and interpret said commands the mobile station has to be active on Layer 3 as well. However, in accordance with the invention, the mobile station in the test mode will not send notification to protocol levels higher than this despite the fact that in normal operation the information about an active connection involves all protocol layers up to the application layer which is related to the data transmitted trough the connection.

When the G loop is closed the mobile station loops in principle the information bits of every burst received on the downlink data channel back to a certain uplink burst. It is here assumed bursty transmission. The same principle can easily be generalized to apply to a situation in which the transmission is continuous; this concerns especially the testing of mobile stations in systems utilizing the code division multiple access (CDMA) method. In the exemplary GSM system each burst has 114 information bits to loop back, excluding the so-called stealing flags. Preferably the loopback does not depend on the contents of the so-called midamble of the received downlink bursts. In uplink bursts the mobile station uses the midamble that it would use anyway.

The test equipment receives the uplink bursts sent by the mobile station and demodulates and decrypts them so that the information bits in a received burst can be processed by the test equipment. To compute the bit error ratio (BER) the test equipment compares the received information bits to the raw data it sent to the mobile station. The signal level at which the downlink bursts are delivered to the terminal equipment is variable so that the bit error ratio observed by the test equipment describes the sensitivity of the receiver in the mobile station especially at low signal levels. It is typical of type approval tests that a certain minimum sensitivity is required of a mobile station, meaning that at a given signal level the bit error ratio must not exceed a predetermined limit value.

When the test is about to end, the testing equipment can order the mobile station to open the test loop by means of a special command message called e.g. OPEN_Multi-slot_loop_CMD. It is not necessary to identify the test loop in the message if it has been specified that a mobile station may have only one active test loop at a time. The mobile station opens the test loop and acknowledges the message it has received with an acknowledge message called e.g. OPEN_Multi-slot_loop_ACK. As the test loop is opened the mobile station returns from test mode to normal operating mode.

Next it will be considered a case where the test equipment wants the mobile station to loop back the downlink data transmitted on the data channel after demodulation, decryption and channel decoding, i.e. from point 327 to point 330, as depicted by arrow 333 in FIG. 3. For simplicity, this test loop can be called the H loop. Let the data channel to be tested be a HSCSD channel. The test equipment sends a CLOSE_Multi-slot_loop_CMD message, which now preferably contains an identifier on the basis of which the mobile station knows that the loop is an H loop. If there can be several kinds of data channels, the data channel in question must also be identified. Again, the test equipment advantageously starts a timer as the message is sent, and the mobile station has to acknowledge the message in a certain period of time set in the timer. The mobile station acknowledges the message with a CLOSE_Multi-slot_loop_ACK and the test equipment stops said timer. The mobile station closes the test loop in a certain period of time from the sending of the acknowledge. Said period of time preferably equals the one that was described above in the case of the G loop.

The operation according to the H loop differs from that of the G loop in that as channel decoding has been performed before the data are looped back uplink, the mobile station is able to examine whether the received data frames contain errors that are revealed by means of checksums included in the data frames. The contents of all error-free received data frames are looped back to uplink data frames belonging to the same data channel and those uplink data frames are fed to the channel encoder. If the mobile station detects an erroneous data frame it notifies the test equipment e.g. by filling the appropriate uplink data frame with zeroes before the uplink data frame is fed to the channel encoder. In the GSM system it is also possible that the mobile station detects in connection with decoding on the basis of the values of the stealing flags that the frame contains data related to the FACCH channel. The invention does not limit the handling of such frames in the test situation. An advantageous solution is to let both the uplink and downlink FACCH channel operate normally in the test situation, specifying no test response for the reception of a frame belonging to the downlink FACCH channel. The same applies to the SACCH channel. Opening of the H loop is carried out in the same way as opening of the G loop described above.

Above it was said that the mobile station loops all the received data back uplink after the closing of the test loop. However, this is just a general principle. Data channels typically may be asymmetric between the uplink and downlink directions, i.e. a multi-slot channel, for example, may have more downlink timeslots than uplink timeslots per frame. To take this into account, advantageous operation both in the G loop case and H loop case includes two alternative mechanisms, and the test equipment can indicate in its CLOSE_Multi-slot_loop_CMD message which one of the mechanisms is activated.

According to the first mechanisnm, the mobile station loops the data received in a given downlink timeslot back to a certain timeslot of the uplink channel which in HSCSD is called the main uplink slot and in GPRS the uplink PACCH timeslot. The downlink timeslot the looping back of which is thus specified is called timeslot X. The invention does not limit the specification of timeslot X.

According to the second mechanism, the mobile station loops back the contents of as many received downlink timeslots as possible in the uplink direction in accordance with certain rules. For HSCSD and GPRS the advantageous rules are as follows:

HSCSD: loop back all bi-directional timeslots and ignore the unidirectional downlink timeslots. This arrangement maintains the logical association with the bi-directional timeslots, which is specified in HSCSD.

GPRS: start with the first downlink timeslot in the frame and loop it back to the first uplink timeslot. Loop back the second downlink timeslot in the frame to the second uplink timeslot and so on, until all the downlink timeslots in the frame have been looped back or there are no more uplink timeslots available.

The following general rules apply preferably to all data channel test loops:

the order of the received downlink data shall be preserved in the loopback, one OPEN_Multi-slot_loop_CMD message shall open all active data channel test loops, assignment to a new multi-slot channel timeslot configuration shall be preceded by an OPEN_Multi-slot_loop_CMD message to open existing test loops, it is the responsibility of the test equipment to ensure correct configuration for the test, disconnection of a data call shall open the test loops in the same way as an OPEN_Multi-slot_loop_CMD message, changing the transmission power, a new channel assignment or a handover shall not affect the test loops, the test equipment shall ensure that a new channel assignment, handover or reconfiguration will not include a timeslot configuration that would affect the test loop, if the above-mentioned first mechanism is used and a timeslot that does not belong to the current timeslot configuration is specified as the new timeslot X, the mobile station shall ignore the new specification of timeslot X and send a negative acknowledgement; the test loop state will not be changed, once the test loop is closed, a new CLOSE_Multi-slot_loop_CMD message shall override the previous one (multiple CLOSE_Multi-slot_loop_CMD messages are not additive), if the data call is disconnected and the test loops are therefore opened, there is no need to send a separate OPEN_Multi-slot_loop_CMD message, a data channel test loop affects only the data channel in question, not e.g. the operation of FACCH or SACCH channels, and data channel test loops have no effect on the operation of possible other simultaneous test loops nor are dependent on them.

The following tables present some preferred forms for the above-mentioned commands. In the tables, M stands for "mandatory presence". V stands for "value". The lengths of information elements are given in octets.

CLOSE_Multi-slot_LOOP_CMD

This message is only sent in the downlink direction (from test equipment to mobile station).

| Information Element | Reference | Presence | Format | Length |
|---|---|---|---|---|
| Protocol discriminator | GSM 04.07 sect. 11.2.1 | M | V | ½ |
| Skip indicator | GSM 04.07 sect. 11.2.2 | M | V | ½ |
| Message type | | M | V | 1 |
| Loop type | | M | V | 1 | where message type is:

| 8 | 7 | 6 | 5 | 4 | 3 | 2 | 1 | bit no. |
|---|---|---|---|---|---|---|---|---|
| 0 | 0 | 1 | 0 | 0 | 0 | 0 | 0 | Octet 1 | and loop type is:

| 8 | 7 | 6 | 5 | 4 | 3 | 2 | 1 | bit no. |
|---|---|---|---|---|---|---|---|---|

-continued

| TN | Loop mechanism | CHC | Octet 1 |
|---|---|---|---|

CHC, channel coding

00 = channel coding not needed, test loop to be activated is G loop
01 = channel coding needed, test loop to be activated is H loop
Other values reserved
Loop mechanism 000 = mechanism 1
001 = mechanism 2
Other values reserved
TN, timeslot number Timeslot number is used only if loop mechanism indicates mechanism 2
TN field is coded as a binary representation of timeslot number as defined in specification GSM 05.10
Range: 0 to 7

CLOSE_Multi-slot_LOOP_ACK

This message is only sent in the uplink direction (from mobile station to test equipment).

| Information Element | Reference | Presence | Format | Length |
|---|---|---|---|---|
| Protocol discriminator | GSM 04.07 sect. 11.2.1 | M | V | ½ |
| Skip indicator | GSM 04.07 sect. 11.2.2 | M | V | ½ |
| Message type | | M | V | 1 |
| Result | | M | V | 1 | where message type is:

| 8 | 7 | 6 | 5 | 4 | 3 | 2 | 1 | bit no. |
|---|---|---|---|---|---|---|---|---|
| 0 | 0 | 1 | 0 | 0 | 0 | 0 | 1 | Octet 1 | and result is:

| 8 | 7 | 6 | 5 | 4 | 3 | 2 | 1 | bit no. |
|---|---|---|---|---|---|---|---|---|
| 0 spare | 0 spare | CHC | | Loop mechanism | | | Error Ind | octet 1 |

CHC, channel coding

00 = channel coding not needed, test loop to be activated is G loop
01 = channel coding needed, test loop to be activated is H loop
Other values reserved
Loop mechanism 000 = mechanism 1
001 = mechanism 2
Other values reserved
Error Ind, error indication 0 = multi-slot channel test loop connected successfully
1 = multi-slot channel test loop connection failed OPEN_Multi-slot_LOOP_CMD This message is only sent in the downlink direction (from test equipment to mobile station).

| Information Element | Reference | Presence | Format | Length |
|---|---|---|---|---|
| Protocol discriminator | GSM 04.07 sect. 11.2.1 | M | V | ½ |
| Skip indicator | GSM 04.07 sect. 11.2.2 | M | V | ½ |
| Message type | | M | V | 1 | where message type is:

| 8 | 7 | 6 | 5 | 4 | 3 | 2 | 1 | bit no. |
|---|---|---|---|---|---|---|---|---------|
| 0 | 0 | 1 | 0 | 0 | 0 | 1 | 0 | Octet 1 |

OPEN_Multi-slot_LOOP_ACK

This message is only sent in the uplink direction (from mobile station to test equipment).

| Information Element | Reference | Presence | Format | Length |
|---|---|---|---|---|
| Protocol discriminator | GSM 04.07 sect. 11.2.1 | M | V | ½ |
| Skip indicator | GSM 04.07 sect. 11.2.2 | M | V | ½ |
| Message type | | M | V | 1 | where message type is:

| 8 | 7 | 6 | 5 | 4 | 3 | 2 | 1 | bit no. |
|---|---|---|---|---|---|---|---|---------|
| 0 | 0 | 1 | 0 | 0 | 0 | 1 | 1 | Octet 1 |

The names and specifications mentioned in this patent application which are related to a certain system or equipment are given by way of example and do not affect the applicability of the invention in all mobile communication systems in which the mobile station can operate on data channels. Furthermore, the invention may be modified in many ways within the scope of the inventional idea defined by the claims set forth below. For example, the closing of the test loop and setting of the mobile station in test mode, as well as the opening of the test loop and returning the mobile station back in normal mode may in a modification of the invention be realized in some other way than by means of a command sent by the test equipment. It can even be thought that these functions are carried out manually, by setting a switch or connector in the mobile station to a desired position. However, as far as test fluency and automation are concerned, it is advantageous that these functions can be performed using commands sent by the test equipment.

What is claimed is:

1. A method for testing the functioning of a data channel in a mobile station, comprising the steps of:
   receiving a command of a certain protocol level from a test equipment external to the mobile station,
   as a response to receiving said command, establishing within the mobile station a data channel test loop to loop downlink data received from the test equipment back to the uplink direction to the test equipment, said looping back taking place functionally below said certain protocol level, and
   during the test, controlling the reception of downlink data and transmission of uplink data in the mobile station by said certain protocol level.

2. The method of claim 1, wherein in response to said command of a certain protocol level received from the test equipment the mobile station is set in test mode in which a notification about a connection established between the test equipment and mobile station is not sent to protocol levels higher than said protocol level.

3. The method of claim 1, wherein said protocol level is a Layer 3 RR level.

4. The method of claim 1, wherein the downlink data are looped back to the uplink direction by the mobile station after demodulation and decryption of the downlink data but prior to any channel decoding of the downlink data.

5. The method of claim 4, wherein
   bursty transmission with certain information bits in at least a number of bursts is used in both downlink and uplink direction and
   the mobile station loops the information bits included in a burst received on a downlink data channel back to a certain uplink burst.

6. The method of claim 1, wherein the downlink data are looped back to the uplink direction by the mobile station after demodulation, decryption and channel decoding of the downlink data.

7. The method of claim 6, wherein
   data frames with certain information bits in at least a number of data frames are used in both downlink and uplink direction,
   the mobile station checks whether a data frame received on a downlink data channel was received error-free and
   the mobile station loops the information bits included in a data frame received on a downlink data channel back to a certain uplink data frame if the downlink data frame was received error-free, and generates an uplink indicator data frame if the downlink data frame was received erroneous.

8. The method of claim 7, wherein in the uplink indicator data frame there are zero bits instead of information bits.

9. The method of claim 1, further comprising, after the step of establishing said test loop, the step of looping back data received in a certain predetermined timeslot of a downlink channel to a certain predetermined most significant timeslot of an uplink channel.

10. The method of claim 9, wherein the entity comprised of the downlink and uplink channels is an HSCSD channel with a certain main uplink timeslot, and said predetermined most significant timeslot of the uplink channel is the main uplink timeslot of the uplink channel.

11. The method of claim 9, wherein the entity comprised of the downlink and uplink channels is a GPRS channel with a certain PACCH timeslot in the uplink channel, and said predetermined most significant timeslot of the uplink channel is the PACCH timeslot of the uplink channel.

12. The method of claim 1, further comprising the steps of
   looping back to the uplink direction all timeslots defined as bi-directional and
   ignoring unidirectional downlink timeslots.

13. The method of claim 1, further comprising, after establishing the test loop, the steps of
looping back the first downlink timeslot of a downlink frame to the first uplink timeslot of an uplink frame,
looping back the second downlink timeslot of said downlink frame to the second uplink timeslot of said uplink frame, and
continuing similarly until all downlink timeslots of said downlink frame have been looped back or said uplink frame has no more uplink timeslots available.

14. A method for testing the functioning of a data channel in an arrangement where a mobile station is coupled to a test equipment, comprising the steps of:
transmitting from the test equipment to the mobile station a certain command of a certain protocol level,
receiving said command at the mobile station,
as a response to receiving said command, establishing within the mobile station a data channel test loop to loop downlink data received from the test equipment back to the uplink direction to the test equipment, said looping back taking place functionally below said certain protocol level,
sending downlink data from the test equipment to the mobile station,
looping back said downlink data into uplink direction to the test equipment by means of said test loop,
comparing within the test equipment the original contents of the downlink data with the contents of the data sent back to the test equipment in the uplink direction in order to measure the bit error ratio occurred in the mobile station and
during the test, controlling the reception of downlink data and transmission of uplink data in the mobile station by said certain protocol level.

15. A mobile station comprising
means for receiving downlink data from a test equipment,
means for sending uplink data to the test equipment, and
means for looping downlink data received from the test equipment back to the uplink direction to the test equipment in response to a command of a certain protocol level, wherein said looping back takes place functionally below said certain protocol level in a manner controlled by said certain protocol level.

16. The mobile station of claim 15, wherein the mobile station is arranged to operate under the control of a protocol according to a certain protocol stack such that said command is a command of a certain predetermined protocol level in said protocol stack, and in response to the reception of said command the mobile station is further arranged so as to enter a test mode in which it does not send a notification of the connection established between the test equipment and mobile station to protocol levels higher than said protocol level.

17. The mobile station of claim 15, further comprising
means for converting received downlink data to baseband, a demodulator for demodulating the data converted to baseband, a decryption block for decrypting the demodulated data, and a channel decoder for channel decoding the demodulated and decrypted data, and
a channel encoder for channel encoding uplink data, an encryption block for encrypting the channel encoded uplink data, a modulator for modulating the encrypted channel encoded uplink data to baseband oscillation, and means for converting the resulting uplink signal to transmission frequency and for transmitting said signal;
wherein said means for looping back the downlink data to the uplink direction comprise means for establishing a coupling from the output of the decryption block to the input of the encryption block.

18. The mobile station of claim 15, further comprising
means for converting received downlink data to baseband, a demodulator for demodulating the data converted to baseband, a decryption block for decrypting the demodulated data, and a channel decoder for channel decoding the demodulated and decrypted data, and
a channel encoder for channel encoding uplink data, an encryption block for encrypting the channel encoded uplink data, a modulator for modulating the encrypted channel encoded uplink data to baseband oscillation, and means for converting the resulting uplink signal to transmission frequency and for transmitting said signal;
wherein said means for looping back the downlink data to the uplink direction comprise means for establishing a coupling from the output of the channel decoder to the input of the channel encoder.

19. The mobile station of claim 15, wherein the mobile station is a GSM mobile station equipped for HSCSD functions.

20. The mobile station of claim 15, wherein the mobile station is a GSM mobile station equipped for GPRS functions.

* * * * *